(12) United States Patent
Lovlekar et al.

(10) Patent No.: US 11,825,501 B2
(45) Date of Patent: Nov. 21, 2023

(54) RADIO RESOURCE MANAGEMENT FOR NETWORK ASSISTED NEW RADIO V2X SIDELINK RESOURCE ALLOCATION

(71) Applicant: Apple Inc., Cupertino, CA (US)

(72) Inventors: Srirang A. Lovlekar, Cupertino, CA (US); Murtaza A. Shikari, Mountain View, CA (US); Sethuraman Gurumoorthy, San Jose, CA (US); Fangli Xu, Beijing (CN); Yuqin Chen, Shenzhen (CN); Haijing Hu, Beijing (CN); Srinivasan Nimmala, San Jose, CA (US); Longda Xing, San Jose, CA (US); Dawei Zhang, Saratoga, CA (US); Sree Ram Kodali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/962,196

(22) Filed: Oct. 7, 2022

(65) Prior Publication Data

US 2023/0033619 A1 Feb. 2, 2023

Related U.S. Application Data

(63) Continuation of application No. 16/782,465, filed on Feb. 5, 2020, now Pat. No. 11,477,796.

(30) Foreign Application Priority Data

Feb. 13, 2019 (CN) .......................... 201910111910.X

(51) Int. Cl.
*H04W 72/541* (2023.01)
*H04W 76/15* (2018.01)
(Continued)

(52) U.S. Cl.
CPC ......... *H04W 72/541* (2023.01); *H04W 24/10* (2013.01); *H04W 36/0085* (2018.08);
(Continued)

(58) Field of Classification Search
CPC ... H04W 28/065; H04W 24/08; H04W 72/20; H04W 80/02; H04W 52/36; H04W 88/06; H04W 72/23
See application file for complete search history.

(56) References Cited

U.S. PATENT DOCUMENTS 7,209,771 B2 4/2007 Twitchell, Jr.
7,774,486 B2 8/2010 Clarke
(Continued)

FOREIGN PATENT DOCUMENTS

EP 3547778 B1 * 3/2022 ............. H04L 5/001
TW I552537 10/2016
(Continued)

OTHER PUBLICATIONS

M. H. C. Garcia et al., "A Tutorial on 5G NR V2X Communications," in IEEE Communications Surveys & Tutorials, vol. 23, No. 3, pp. 1972-2026, thirdquarter 2021, doi: 10.1109/COMST.2021. 3057017. (Year: 2021).*

(Continued)

*Primary Examiner* — William D Cumming
(74) *Attorney, Agent, or Firm* — Kowert, Hood, Munyon, Rankin & Goetzel, P.C.

(57) ABSTRACT

Various radio resource management techniques may be implemented to reduce in-device coexistence issues and/or interference between a Uu link established between a mobile device (first UE) and a base station (first NB), and a sidelink/PC5 link established between the first UE and another mobile device (second UE), where the second UE is served by a different base station (second NB). The first UE
(Continued)

may receive, from the first NB, measurement configuration information that enables/configures the first UE to report to the NB any indication(s) of issues caused by communications between the first UE and the second UE over the PC5 link affecting communications between the first UE and the first NB over the Uu link, and/or communications over the Uu link affecting communications over the PC5 link. The first NB may analyze the feedback from the first UE and may implement mitigation measures to reduce/eliminate any interference and/or in-device-coexistence issues.

20 Claims, 11 Drawing Sheets

(51) Int. Cl.

| | | |
|---|---|---|
| *H04W 36/00* | (2009.01) | |
| *H04W 72/20* | (2023.01) | |
| *H04W 24/10* | (2009.01) | |
| *H04W 36/14* | (2009.01) | |
| *H04W 88/06* | (2009.01) | |

(52) U.S. Cl.
CPC .......... *H04W 36/14* (2013.01); *H04W 72/20* (2023.01); *H04W 76/15* (2018.02); *H04W 88/06* (2013.01)

(56) References Cited

U.S. PATENT DOCUMENTS

| | | | |
|---|---|---|---|
| 8,126,461 B2 | 2/2012 | Sengupta | |
| 8,693,437 B2 | 4/2014 | Wu | |
| 8,812,008 B2 | 8/2014 | Wang | |
| 9,049,694 B2 | 6/2015 | Wu | |
| 9,240,881 B2 | 1/2016 | Broustis | |
| 9,252,896 B2 | 2/2016 | Edge | |
| 9,276,684 B2 | 3/2016 | Edge | |
| 9,276,700 B2 | 3/2016 | Faurie | |
| 9,439,166 B2 | 9/2016 | Siomina | |
| 9,496,971 B2 | 11/2016 | Edge | |
| 9,532,340 B2 | 12/2016 | Lu | |
| 9,532,396 B2 | 12/2016 | Kalapatapu | |
| 9,723,647 B2 | 8/2017 | Yu | |
| 9,838,901 B2 | 12/2017 | Lee | |
| 9,838,949 B2 | 12/2017 | Jin | |
| 9,854,044 B2 | 12/2017 | Kazmi | |
| 10,237,896 B2 | 3/2019 | Novlan | |
| 10,271,307 B2 | 4/2019 | Lee | |
| 10,306,652 B2 | 5/2019 | Li | |
| 10,321,401 B2 | 6/2019 | Li | |
| 10,356,733 B2 | 7/2019 | Gupta | |
| 10,367,677 B2 | 7/2019 | Parkvall | |
| 10,383,137 B2 | 8/2019 | Gupta | |
| 10,390,247 B2 | 8/2019 | Raghunathan | |
| 10,390,362 B2 | 8/2019 | Gupta | |
| 10,425,959 B2 | 9/2019 | Li | |
| 10,477,566 B2 | 11/2019 | Gupta | |
| 10,484,066 B2 | 11/2019 | Subramanian | |
| 10,492,122 B2 | 11/2019 | Jin | |
| 10,531,333 B1* | 1/2020 | Kim | H04W 72/20 |
| 10,581,512 B2* | 3/2020 | Huang | H04B 7/15557 |
| 10,631,205 B2* | 4/2020 | Kim | H04W 72/20 |
| 10,667,176 B2* | 5/2020 | Kim | H04W 28/065 |
| 10,728,935 B2 | 7/2020 | Novlan | |
| 10,813,136 B2 | 10/2020 | Yerramalli | |
| 10,820,222 B2 | 10/2020 | Faurie | |
| 10,856,345 B2 | 12/2020 | Gulati | |
| 10,931,426 B2 | 2/2021 | Desai | |
| 11,184,785 B2 | 11/2021 | Zacharias | |
| 11,375,510 B2* | 6/2022 | Belleschi | H04W 72/52 |
| 2005/0036513 A1 | 2/2005 | Clarke | |
| 2005/0215280 A1 | 9/2005 | Twitchell, Jr. | |
| 2008/0102832 A1 | 5/2008 | Sengupta | |
| 2010/0293259 A1 | 11/2010 | Clarke | |
| 2011/0211554 A1 | 9/2011 | Bultmann | |
| 2012/0063421 A1 | 3/2012 | Wu | |
| 2012/0213153 A1 | 8/2012 | Faurie | |
| 2012/0252510 A1 | 10/2012 | Wang | |
| 2013/0083699 A1 | 4/2013 | Wu | |
| 2013/0290696 A1 | 10/2013 | Broustis | |
| 2014/0162544 A1 | 6/2014 | Edge | |
| 2014/0162545 A1 | 6/2014 | Edge | |
| 2014/0162687 A1 | 6/2014 | Edge | |
| 2014/0162688 A1 | 6/2014 | Edge | |
| 2014/0256334 A1 | 9/2014 | Kazmi | |
| 2015/0085740 A1 | 3/2015 | Kalapatapu | |
| 2015/0126208 A1 | 5/2015 | Yu | |
| 2015/0181546 A1 | 6/2015 | Freda | |
| 2015/0222401 A1 | 8/2015 | Xu | |
| 2015/0257118 A1 | 9/2015 | Siomina | |
| 2015/0319673 A1 | 11/2015 | Jin | |
| 2015/0319746 A1 | 11/2015 | Lu | |
| 2015/0365994 A1 | 12/2015 | Yu | |
| 2016/0021566 A1 | 1/2016 | Kimura | |
| 2016/0100355 A1 | 4/2016 | Chen | |
| 2016/0165477 A1 | 6/2016 | Faurie | |
| 2016/0242064 A1 | 8/2016 | Lee | |
| 2016/0323777 A1 | 11/2016 | Pan | |
| 2016/0381509 A1 | 12/2016 | Edge | |
| 2017/0127405 A1 | 5/2017 | Agiwal | |
| 2017/0303144 A1 | 10/2017 | Guo | |
| 2017/0331670 A1 | 11/2017 | Parkvall | |
| 2017/0347394 A1 | 11/2017 | Yasukawa | |
| 2017/0353819 A1 | 12/2017 | Yin | |
| 2017/0353971 A1 | 12/2017 | Gupta | |
| 2018/0035278 A1 | 2/2018 | Aminaka | |
| 2018/0035448 A1 | 2/2018 | Gupta | |
| 2018/0049083 A1 | 2/2018 | Kubota | |
| 2018/0049129 A1 | 2/2018 | Li | |
| 2018/0049219 A1 | 2/2018 | Gupta | |
| 2018/0063735 A1 | 3/2018 | Raghunathan | |
| 2018/0070259 A1 | 3/2018 | Lee | |
| 2018/0077628 A1 | 3/2018 | Jin | |
| 2018/0152234 A1* | 5/2018 | Huang | H04B 7/15557 |
| 2018/0192443 A1 | 7/2018 | Novlan | |
| 2018/0234980 A1 | 8/2018 | Li | |
| 2018/0270682 A1 | 9/2018 | Zacharias | |
| 2018/0287683 A1 | 10/2018 | Subramanian | |
| 2018/0295646 A1 | 10/2018 | Faurie | |
| 2018/0324780 A1 | 11/2018 | Novlan | |
| 2019/0020987 A1 | 1/2019 | Khoryaev | |
| 2019/0052436 A1 | 2/2019 | Desai | |
| 2019/0069325 A1 | 2/2019 | Yerramalli | |
| 2019/0075566 A1 | 3/2019 | Kim | |
| 2019/0098489 A1 | 3/2019 | Shi | |
| 2019/0110325 A1 | 4/2019 | Gulati | |
| 2019/0132023 A1 | 5/2019 | Tokgoz | |
| 2019/0159269 A1 | 5/2019 | Novlan | |
| 2019/0261208 A1 | 8/2019 | Lee | |
| 2019/0289617 A1 | 9/2019 | Gupta | |
| 2020/0008098 A1* | 1/2020 | Kim | H04W 28/065 |
| 2020/0022043 A1 | 1/2020 | Pelletier | |
| 2020/0028745 A1 | 1/2020 | Parkvall | |
| 2020/0067585 A1 | 2/2020 | Subramanian | |
| 2020/0068438 A1* | 2/2020 | Kim | H04W 80/02 |
| 2020/0077301 A1* | 3/2020 | Kim | H04W 80/02 |
| 2020/0229194 A1* | 7/2020 | Belleschi | H04L 5/0064 |
| 2020/0260463 A1 | 8/2020 | Lovlekar | |
| 2020/0288347 A1* | 9/2020 | Kim | H04W 72/20 |
| 2020/0305139 A1* | 9/2020 | Xu | H04W 72/23 |
| 2021/0058810 A1 | 2/2021 | Faurie | |
| 2021/0168814 A1* | 6/2021 | Chen | H04W 72/02 |
| 2021/0219268 A1* | 7/2021 | Li | H04W 72/20 |
| 2021/0314796 A1* | 10/2021 | Hoang | H04W 52/36 |
| 2021/0345234 A1* | 11/2021 | Liang | H04W 48/16 |
| 2022/0256386 A1* | 8/2022 | Kimba Dit Adamou | H04L 5/00 |

(56) References Cited

U.S. PATENT DOCUMENTS

| | | | | |
|---|---|---|---|---|
| 2022/0321294 A1* | 10/2022 | Ren | ........................ | H04W 4/023 |
| 2023/0033619 A1* | 2/2023 | Lovlekar | ............... | H04W 88/06 |

FOREIGN PATENT DOCUMENTS

| | | | | |
|---|---|---|---|---|
| WO | 2011134360 | | 11/2011 | |
| WO | 2021087660 | | 5/2013 | |
| WO | 2017183866 | | 10/2017 | |
| WO | WO-2018128372 A1 * | 7/2018 | ............. | H04L 5/001 |
| WO | 2017171895 | | 10/2019 | |
| WO | WO-2020033477 A1 * | 2/2020 | ............. | H04W 24/08 |
| WO | WO-2023088038 A1 * | 5/2023 | ............. | H04L 5/001 |

OTHER PUBLICATIONS

A Survey of Device-to-Device Communications: Research Issues and Challenges by Furqan Jameel; Zara Hamid; Farhana Jabeen; Sherali Zeadally; Muhammad Awais Javed Published in: IEEE Communications Surveys & Tutorials (vol. 20, Issue: 3, thirdquarter 2018) Apr. 2018 (Year: 2018).

F. Jameel, Z. Hamid, F. Jabeen, S. Zeadally and M.A. Javed, "A Survey of Device-to-Device Communications: Research Issues and Challenges," in IEEE Communications Surveys & Tutorials, vol. 20, No. 3, pp. 2133-2168, thirdquarter 2018, doi: 10.1109/COMST.2018.2828120. (Year: 2018).

M. Haenggi, J. G. Andrews, F. Baccelli, 0. Dousse and M. Franceschetti, "Stochastic geometry and random graphs for the analysis and design of wireless networks," in IEEE Journal on Selected Areas in Communications, vol. 27, No. 7, pp. 1029-1046, Sep. 2009, doi: 10.1109/JSAC.2009.090902. (Year: 2009).

IEEE Standard for Local and metropolitan area networks—Part 21.1: Media Independent Services Published in: IEEE Std 802.21.1-2017 (pp. 1-211) Apr. 2017 (Year: 2017).

First Office Action for Chinese Patent Application 201910111910.X; 8 pages; dated Nov. 29, 2022.

* cited by examiner

RADIO RESOURCE MANAGEMENT FOR NETWORK ASSISTED NEW RADIO V2X SIDELINK RESOURCE ALLOCATION

PRIORITY CLAIM

This application is a continuation of U.S. patent application Ser. No. 16/782,465 titled "Radio Resource Management for Network Assisted New Radio V2X Sidelink Resource Allocation", filed on Feb. 5, 2020, and which claims benefit of priority of Chinese Patent Application Serial No. 201910111910.X titled "Radio Resource Management for Network Assisted New Radio V2X Sidelink Resource Allocation", filed on Feb. 13, 2019, each of which is hereby incorporated by reference as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD OF THE INVENTION

The present application relates to wireless communications, and more particularly to radio resource management for network assisted NR (new radio) sidelink resource allocation, e.g. network assisted NR V2X (vehicle-to-everything) sidelink resource allocation.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. One proposed use of cellular communications is in vehicular applications, particularly in V2X (vehicle-to-everything) communications. V2X systems allow for communication between vehicles (e.g., communications devices housed in or otherwise carried by vehicles), pedestrian UEs (including UEs carried by cyclists), etc., in order to coordinate traffic activity, facilitate autonomous driving, and perform collision avoidance, among other purposes. UEs in V2X systems widely use sidelink communications which represent a special kind of cellular wireless communication mechanism between devices that is not carried through a base station, e.g. through eNB/gNB. In network assisted Sidelink (SL) resource allocation, a base station (NB) allocates SL resources to the UEs for SL communications to be carried out by the UEs. In this mode of communication, the UEs transmit and receive data/information over the Uu interface link (an interface between the UE and the base station) and also transmit and receive data on SL channel(s) to/from other UE(s). In addition, UEs may also use other communication protocols like Wi-Fi on overlapping or adjacent frequency bands in relation to the carrier for SL communications. Concurrent operation on SL and Uu interface links may lead to interference and therefore degraded and/or compromised performance of the UEs.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to implement improved radio resource management (RRM) for network assisted NR (new radio) sidelink resource allocation, for example network assisted NR V2X (vehicle-to-everything) sidelink resource allocation for wireless cellular communications such as 3GPP LTE/NR and/or 3GPP LTE/NR V2X communications. Embodiments are further presented herein for wireless communication systems containing wireless communication devices (UEs) and/or base stations and access points (APs) communicating with each other within the wireless communication systems.

In order to reduce in-device coexistence issues and/or interference between different radio links associated with the same radio access technology, e.g. between a Uu link established between a mobile device (e.g. first UE) and a base station (e.g. first NB or first gNB), and a sidelink/PC5 link established between the mobile device and another mobile device (e.g. second UE), various RRM techniques may be implemented. Accordingly, a first UE may communicate with a first NB over a first radio link, for example over a first NR Uu link. As part of that communication, the first UE may receive from the first NB first information that includes resource configuration information for communicating with a second UE over a second radio link, for example over a PC5 link (or sidelink), and also includes measurement configuration information for reporting to the first NB an indication of issues caused by communications over the PC5 link and affecting communications over the Uu link, and/or issues caused by communications over the Uu link and affecting communications over the PC5 link. The first UE may subsequently communicate with the second UE over the PC5 link according to the received resource configuration information.

The resource configuration information and the measurement configuration information may be received by the first UE in separate messages or they may be received in the same message. The first UE may transmit the indication to the first NB according to the measurement configuration information. The indication may include a measurement report pertaining to the communications conducted over the PC5 link and/or it may include an in-device-coexistence report pertaining to problems associated with the communications conducted over the Uu link and/or the communications conducted over the PC5 link. The first UE may receive second information from the first NB at least in response to transmitting the indication to the first NB, with the second information including reconfiguration parameters associated with updated resource allocations for the Uu link and/or the PC5 link. The first UE may then switch to communicating over the Uu link and/or the PC5 link according to the updated resource allocations to reduce interference between the Uu link and the PC5 link in comparison to communications conducted over the PC5 link according to the (initial or original) resource configuration information.

In addition, the first NB may (re)transmit the indication(s) to a third device (to a second base station or second NB) over a third radio link, for example over an X2 link established between the first NB and the second NB. The indication(s) may include interference information pertaining to the communications conducted over the PC5 link, and/or may include resource recommendation pertaining to resource allocations for the PC5 link at the second UE. Upon receiving the indication(s), the second NB may reconfigure resource allocations for the PC5 link at the second UE. The second UE may inform the first UE that the resource allocations for the PC5 link have been reconfigured at the second UE. The communications over the PC5 link may encompass unicast communications, broadcast communications, and/or groupcast communications.

In some embodiments, the resource configuration information may include a primary PC5 configuration and a secondary PC5 configuration, exceptional resources, and may further include a threshold condition that may determine when switching from the primary configuration to the secondary configuration may be warranted. The first UE may begin communicating with the second UE over the PC5 link according to the primary configuration, and may subsequently switch from communicating over the PC5 link according to the primary configuration to communicating over the PC5 link according to the secondary configuration in response to one or more conditions being met, or an unidentified error being encountered/experienced while communicating according to the primary configuration. The one or more conditions being met may include the threshold condition being met. Alternately, the secondary configuration may be provided to the first UE by a proximity services function when the UE is in service, for later out of coverage scenarios, for example when the first UE is out of coverage and cannot establish the Uu link at a later time (after having received the secondary configuration from the ProSe function).

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
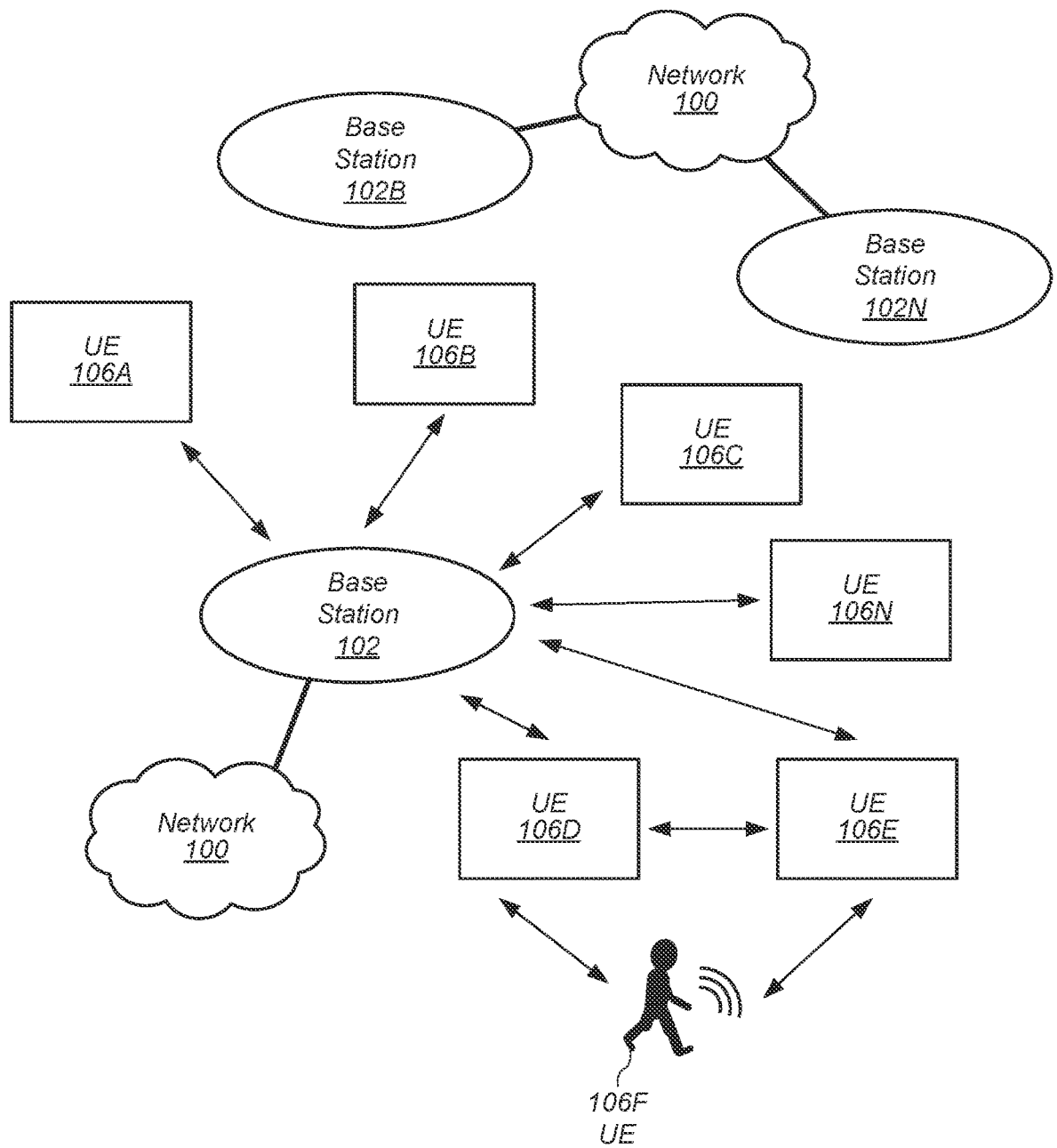
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Access Stratum
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request CS: Circuit Switched
DL: Downlink (from BS to UE)
DSDS: Dual SIM Dual Standby
DYN: Dynamic
EDCF: Enhanced Distributed Coordination Function
EUTRA: Evolved Universal Terrestrial Radio Access
FDD: Frequency Division Duplexing
FDM: Frequency Division Multiplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NAS: Non-Access Stratum
OOS: Out of Sync
OTA: Over the Air
PAL: Priority Access Licensee
PDCP: Packet Data Convergence Protocol
PDN: Packet Data Network
PDU: Protocol Data Unit
PGW: PDN Gateway
PLMN: Public Land Mobile Network
ProSe: Proximity Services
PSD: Power Spectral Density
PSS: Primary Synchronization Signal
PT: Payload Type
QBSS: Quality of Service Enhanced Basic Service Set
QI: Quality Indicator
RAN: Radio Access Network
RAT: Radio Access Technology
RF: Radio Frequency
ROHC: Robust Header Compression
RRC: Radio Resource Control
RSU: Roadside Unit
RTP: Real-time Transport Protocol
RTT: Round Trip Time
RX: Reception/Receive
SAS: Spectrum Allocation Server
SI: System Information
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TDM: Time Division Multiplexing
TX: Transmission/Transmit
UE: User Equipment
UI: User Interface
UL: Uplink (from UE to BS)
UMTS: Universal Mobile Telecommunication System
USIM: UMTS Subscriber Identity Module
V2X: Vehicle to Everything
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
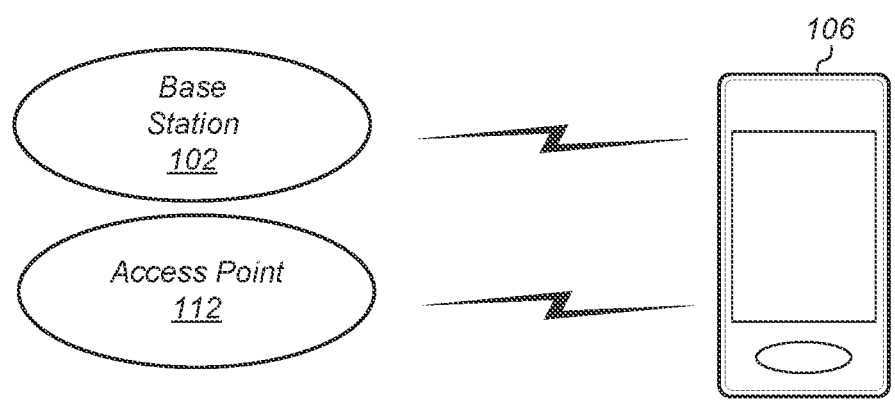
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base stations 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UEs 106. Various ones of the UE devices may implement improved radio resource management for network assisted NR sidelink resource allocation, e.g. network assisted NR V2X (vehicle-to-everything) sidelink resource allocation for wireless cellular communications such as 3GPP LTE/NR and/or 3GPP LTE/NR V2X communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may also be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, base station 102A may implement improved radio resource management for network assisted NR sidelink resource allocation, e.g. network assisted NR V2X sidelink resource allocation for wireless cellular communications such as 3GPP LTE/NR and/or 3GPP LTE/NR V2X communications, as described herein. Depending on a given application or specific considerations, for convenience some of the various different RATs may be functionally grouped according to an overall defining characteristic. For example, all cellular RATs may be collectively considered as representative of a first (form/ type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B ... 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in a network exemplified in FIG. 1 will be discussed below, for example in the context of vehicle-to-everything (V2X) communication such as the communications specified by 3GPP TS 22.185 V 14.3.0, among others.

FIG. 2 illustrates an exemplary user equipment 106 (e.g., one of the devices 106-A through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
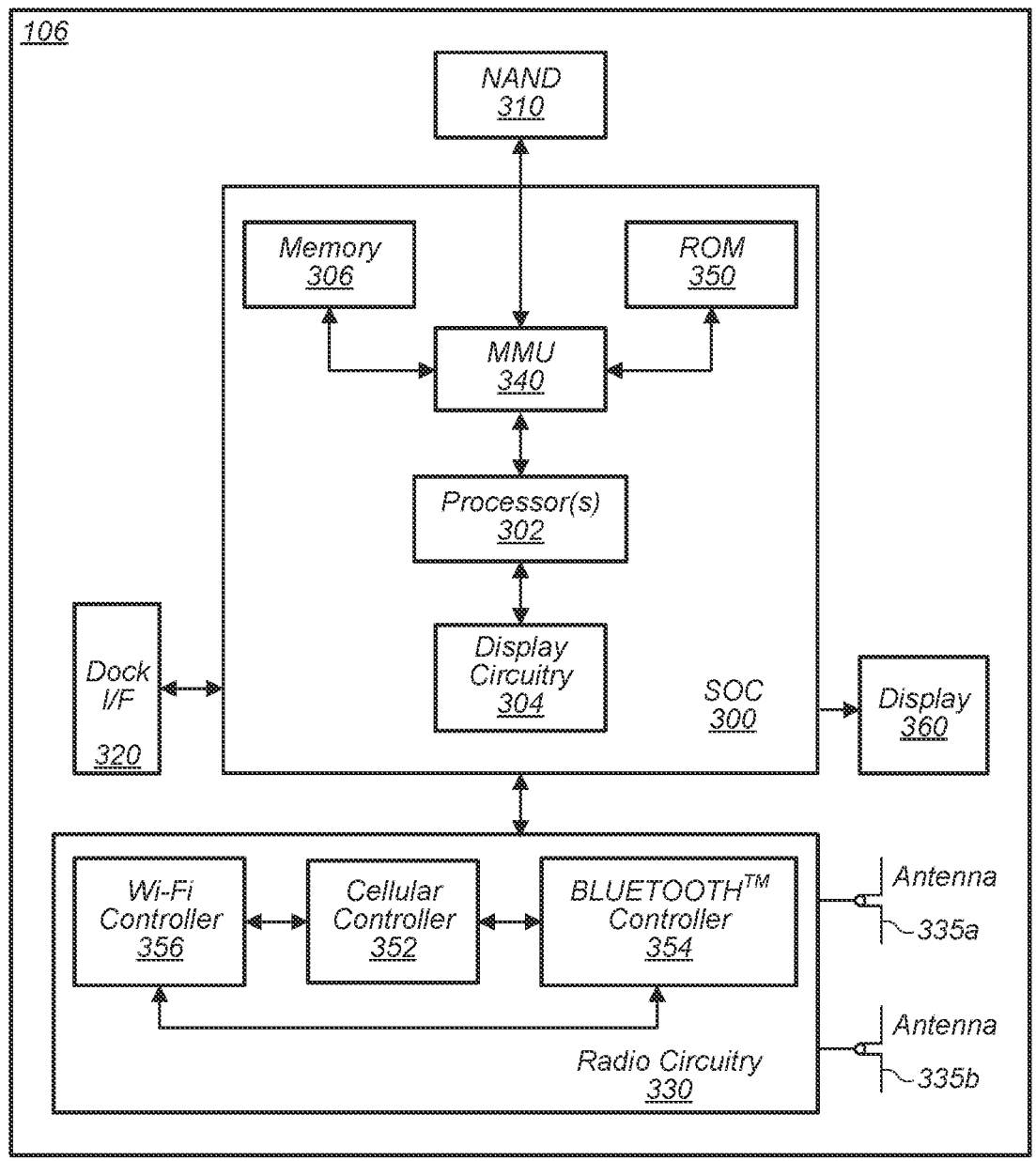
FIG. 3 shows an exemplary block diagram of a UE, according to some embodiments.

FIG. 3—Block Diagram of Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for improved radio resource management for network assisted NR sidelink resource allocation, e.g. network assisted NR V2X sidelink resource allocation for wireless cellular communications such as 3GPP LTE/NR and/or 3GPP LTE/NR V2X communications, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement improved radio resource management for network assisted NR sidelink resource allocation, e.g. network assisted NR V2X sidelink resource allocation for wireless cellular communications such as 3GPP LTE/NR and/or 3GPP LTE/NR V2X communications, according to various embodiments disclosed herein. Processor(s) 302 may also implement various other applications and/or end-user applications running on UE 106.

Figure 5:
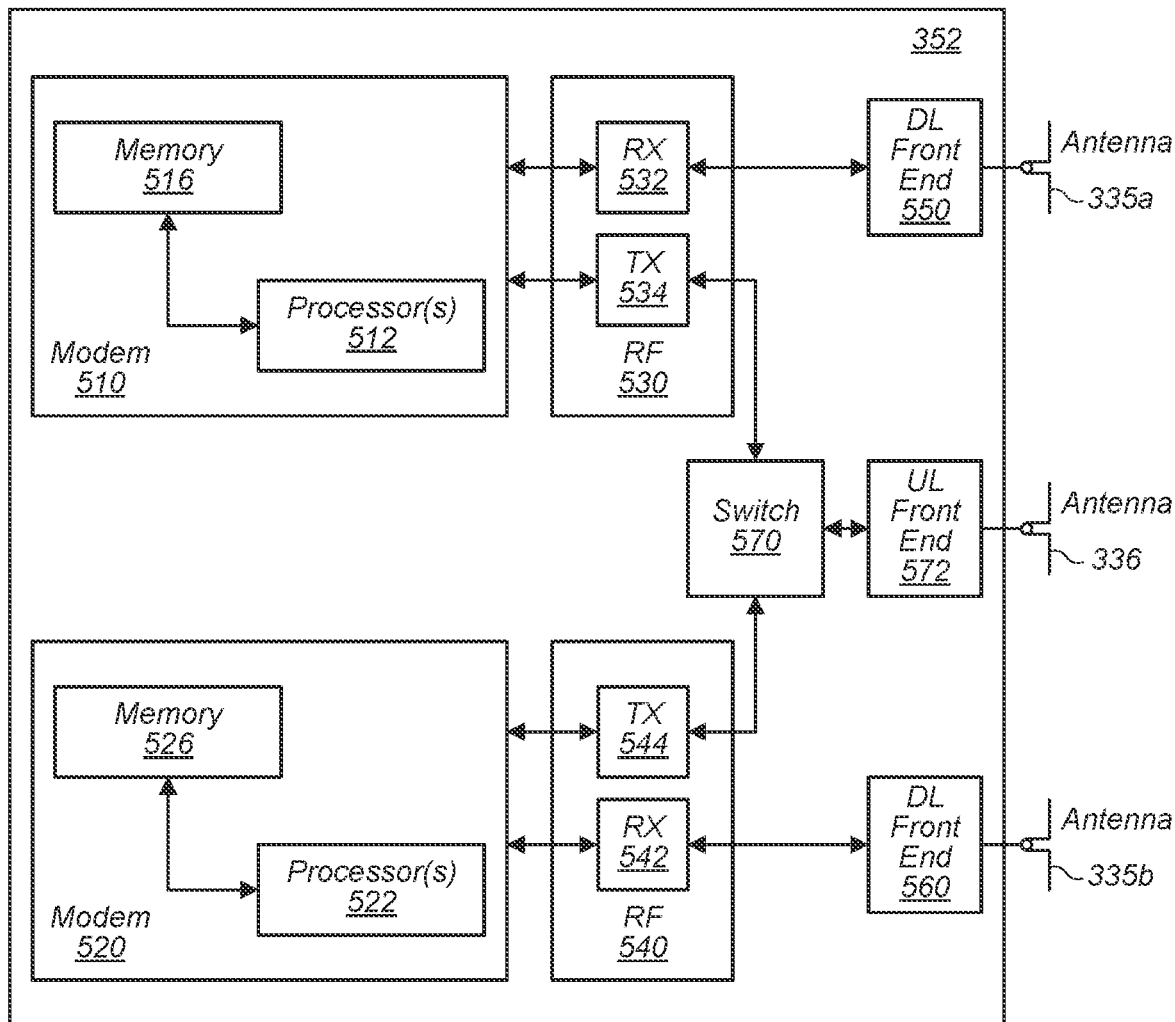
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
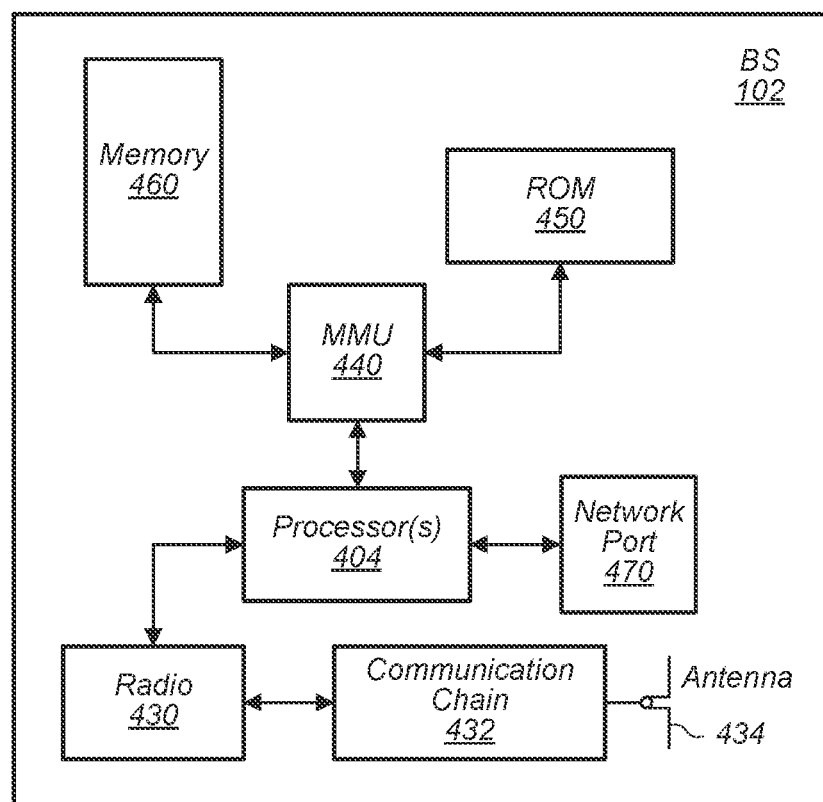
FIG. 4 shows an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, collectively referred to as antenna(s) 434. The antenna(s) 434 may be configured to operate as a wireless transceiver(s) and may be further configured to communicate with UE devices 106 via radio 430. The antenna(s) 434 communicate(s) with the radio 430 via communication chain 432. Communication chain 432 may be a receive chain, a transmit chain or both (transceiver chain). The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement improved radio resource management for network assisted NR sidelink resource allocation, e.g. network assisted NR V2X sidelink resource allocation for wireless cellular communications such as 3GPP LTE/NR and/or 3GPP LTE/NR V2X communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UE devices using improved radio resource management for network assisted NR sidelink resource allocation, e.g. network assisted NR V2X sidelink resource allocation for wireless cellular communications such as 3GPP LTE/NR and/or 3GPP LTE/NR V2X communications.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
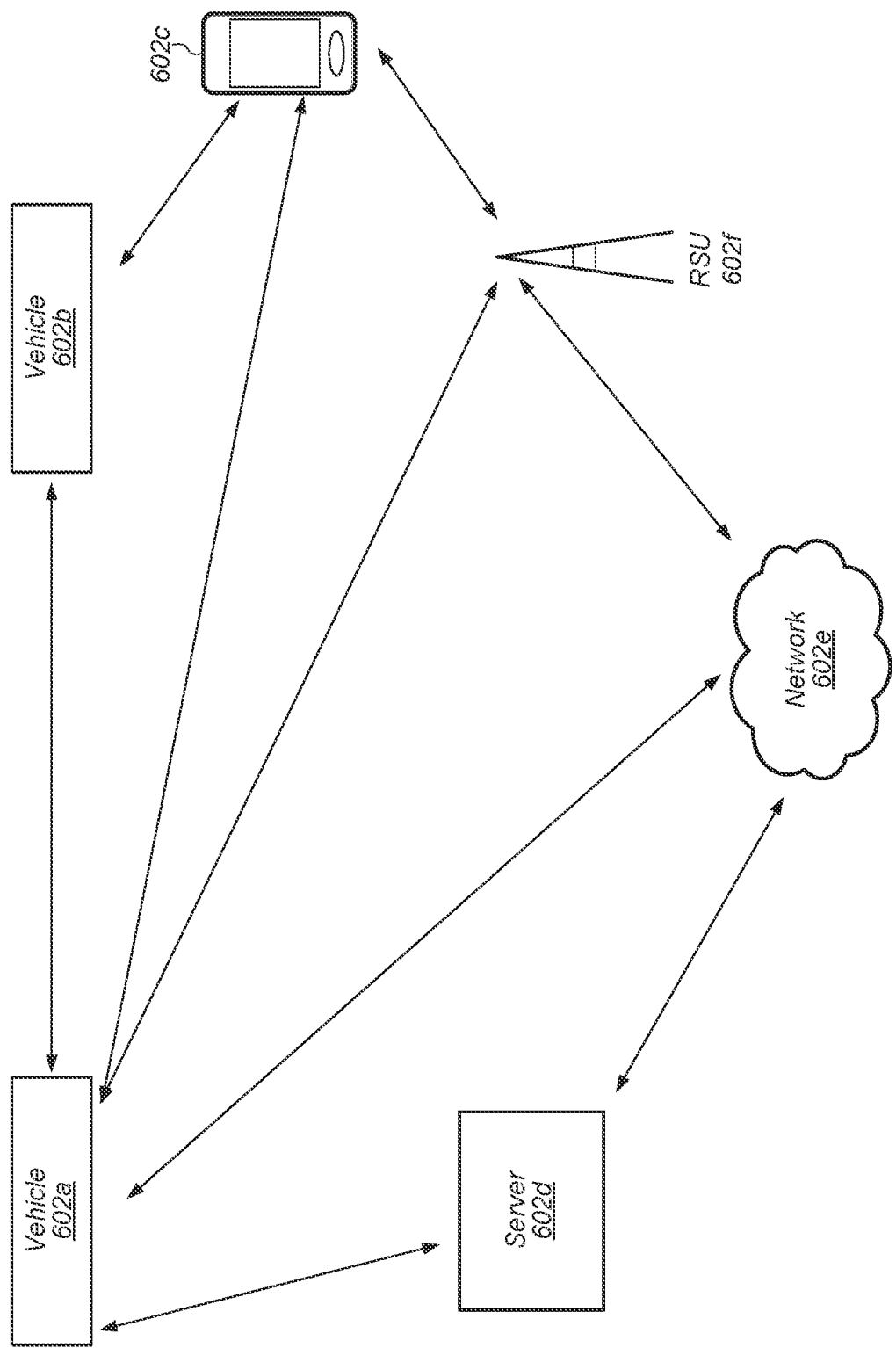
FIG. 6 shows an example of vehicle-to-everything network, according to some embodiments.

FIG. 6—Exemplary Vehicle-to-Everything Communications Network

FIG. 6 illustrates an exemplary vehicle-to-everything (V2X) communications network, (e.g., as specified by 3GPP TS 22.185 V 14.3.0), which allows for communication between a vehicle (e.g., a mobile unit within a vehicle, such as a wireless device incorporated into or currently contained within a vehicle and/or another transmitter contained in or otherwise incorporated within a vehicle) and other vehicles and/or various wireless devices. In general, V2X communication systems are networks in which vehicles, UEs, and other network entities exchange communications in order to coordinate traffic activity, among other possible purposes. V2X communications include communications conveyed between a vehicle (e.g., a wireless device or communication device constituting part of the vehicle, or contained in or otherwise borne along by the vehicle) and various other devices. V2X communications may include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also include communications between UEs and/or other devices for the purpose of sharing V2X information.

As mentioned above, V2X communications may, for example, adhere to 3GPP specifications, and they may also adhere to other subsequent or similar standards whereby vehicles and other network entities may communicate. For example, as illustrated in FIG. 6, a vehicle, such as vehicle 602a may be in communication with various devices (e.g., devices 602b-602f), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short- to medium-range communications (e.g., non-cellular) communications. Cellular-capable V2X communications may be called cellular V2X (C-V2X) communications. C-V2X systems may use various cellular radio access technologies (RATs), such as LTE and/or 5G-NR. In some contemplated implementations, at least some cellular communications as well as non-cellular communications may use unlicensed bands as well as a dedicated spectrum at 5.9 GHz. Moreover, V2X communications may include unicast, groupcast, and/or broadcast communications.

As noted above, there may be many types of devices participating in a V2X communications system. A V2X system may include vehicles, cellular base stations, roadside units (RSUs), and mobile or portable UE devices that may be carried or worn by pedestrians, i.e., pedestrian UEs (PUEs), such as a mobile handset or smartwatch, among other devices. In at least some embodiments of a V2X system, various devices and entities may communicate with other devices or entities (and not necessarily only with vehicles). It should be noted that as used herein, "user devices" or UE may generally refer to devices that are associated with mobile actors or traffic participants of the V2X system, i.e., mobile (able-to-move) communication devices such as vehicles and PUEs. Conversely, "infrastructure devices" may refer to devices in the V2X system which are not traffic actors (i.e., not pedestrians, vehicles, or other users), such as RSUs and base stations Sidelink Communications As previously mentioned, sidelink (SL) communications represent a special kind of cellular wireless communication mechanism between devices which is not carried through a base station, e.g. through eNB/gNB. In other words, the devices communicate with each other without that communication going through a base station. In one sense, the devices may be said to be communicating with each other directly. Accommodation of such communication however requires a new physical layer design, albeit with minimal design changes to existing implementations in order for new design not to differ substantially from preexisting designs. In general, vehicle-to-vehicle (V2V) communications, and also at least part of V2X communications, are based on device-to-device (D2D) communications defined as part of ProSe (proximity services). The sidelink interface, also referred to as PC5, is a part of ProSe and has been enhanced for vehicular use cases, specifically addressing high speed (up to 250 mph) and high density (thousands of nodes).

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, categorized into four groups: vehicle platooning, extended sensors, advanced driving, and remote driving. Platooning is a cooperative driving application according to which multiple vehicles travel in the same lane as in a convoy, keeping a specified (preferably constant) inter-vehicle distance between each other in order to increase their traffic efficiency, e.g. to reduce fuel consumption and gas emissions and to achieve safe and efficient transport. To achieve platooning, vehicles in a platoon may use multiple on-board sensors (e.g., radars, lidars—light detection and ranging, positioning systems, etc.) and sidelink vehicle-to-vehicle communications to synchronize their on-road operations, e.g. pertaining to breaking, changing lanes, stopping, etc. Vehicle platooning requires both groupcast transmissions (e.g. for relaying status information for platoon management) and unicast transmissions (e.g. for communication between two members). Efficient intra-platooning communications and inter-platooning communications may help achieve better spectrum/power efficiency while maintaining fair resource competition, e.g. between members of the same platoon and also between platoons, (consequently, between members of different platoons).

Interference and Coexistence in Sidelink and Uplink/Downlink Communications

As previously mentioned, in network assisted SL resource allocation, a base station (NB) may allocate SL resources to the UEs for SL communications to be carried out by the UEs. The UEs may transmit and receive data/information over the Uu interface link (an interface between the UE and the NB) and may also transmit and receive data on SL channel(s) from other UE(s). It should be noted that as used herein, SL channels are also referred to as PC5 interfaces, and the terms SL channel and PC5 interface are used interchangeably when referencing sidelink communications. In addition, UEs may also use other communication protocols such as Wi Fi on overlapping or adjacent frequency bands in relation to the carrier for SL communications. Such concurrent operation on PC5 and Uu interface links may lead to interference and degraded and/or compromised performance of the UEs.

In general, concurrent operation on PC5 and Uu interfaces may lead to interference. For example, the SL transmissions from the UEs (in unicast, groupcast or broadcast mode of C-V2X communication, i.e. cellular V2X communications) may interfere with reception on the Uu link. The NB tasked with scheduling the resources for the PC5 communication for a paired UE might not be aware of the interference on its unicast receiver UE. Similarly, the NB may not be aware of the interference problem experienced by its own UE. For example, the UE may have to transmit and receive simultaneously on overlapping frequency bands on the Uu and PC5 links. The Uu link may have SCELLs (secondary cells) activated on an unlicensed frequency band, e.g. on band B46 in the 5150 MHz to 5925 MHz frequency range, or it may operate entirely on unlicensed bands, e.g. on bands such as NR-U bands, or on MulteFire, which is a technology designed for deployment of LTE/NR cellular communications in the unlicensed spectrum. MulteFire, unlike LTE-U and License-Assisted Access (LAA) strategies that rely on carrier aggregation of a licensed LTE/NR spectrum anchor with an unlicensed band(s), allows the standalone use of LTE/NR in the unlicensed spectrum. It should also be noted that the NR-U spectrum may also be used in UL/DL carrier aggregation with the primary link or the serving cell operating in (or on) an unlicensed band(s). In-device-coexistence (IDC) problems may manifest when a UE uses PC5 on a carrier/band that overlaps with or is adjacent to the unlicensed carrier band used for LAA/LTE-U operations. This may occur when related UE hardware components, such as antennas, are shared between LAA and PC5 operations.

Figure 7:
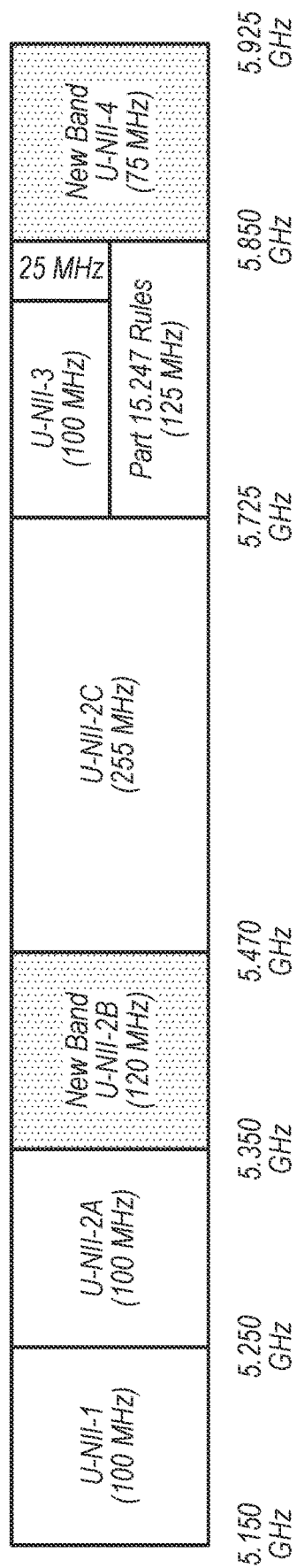
FIG. 7 shows a diagram detailing unlicensed frequency band allocations for wireless communications.

Concurrent use of radio circuitry for other radio access technologies (RATs) such as Wi-Fi, for example, may further interfere with PC5 reception. C-V2X communications are currently allocated in the 5850 MHz to 5925 MHz frequency band, while Wi-Fi 802.11a communications are conducted in the 5180 MHz to 5700 MHz and 5725 MHz to 5850 MHz frequency range. FIG. 7 shows a diagram detailing some of the (unlicensed) frequency bands allocated for wireless communications. Wi-Fi communications are conducted in the 5180 MHz to 5700 MHz range which include the U-NII-1, U-NII-2A, U-NII-2B, and U-NII-2C bands, and further in the 5725 MHz to 5850 MHz frequency range which is indicated as the U-NII-3 band.

In addition to interference and coexistence problems, PC5 resources allocated by the NB may not be usable or may be inefficient for use by the UE. For example, the SL channel may have a high channel-busy ratio (CBR) or high block-error rate (BLER) due to high speed mobility, leading to low throughput and excessive packet drops. UEs currently have no way of informing the NB about PC5 resource issues to allow the NB to reconfigure the resource(s) for better performance.

Figure 8:
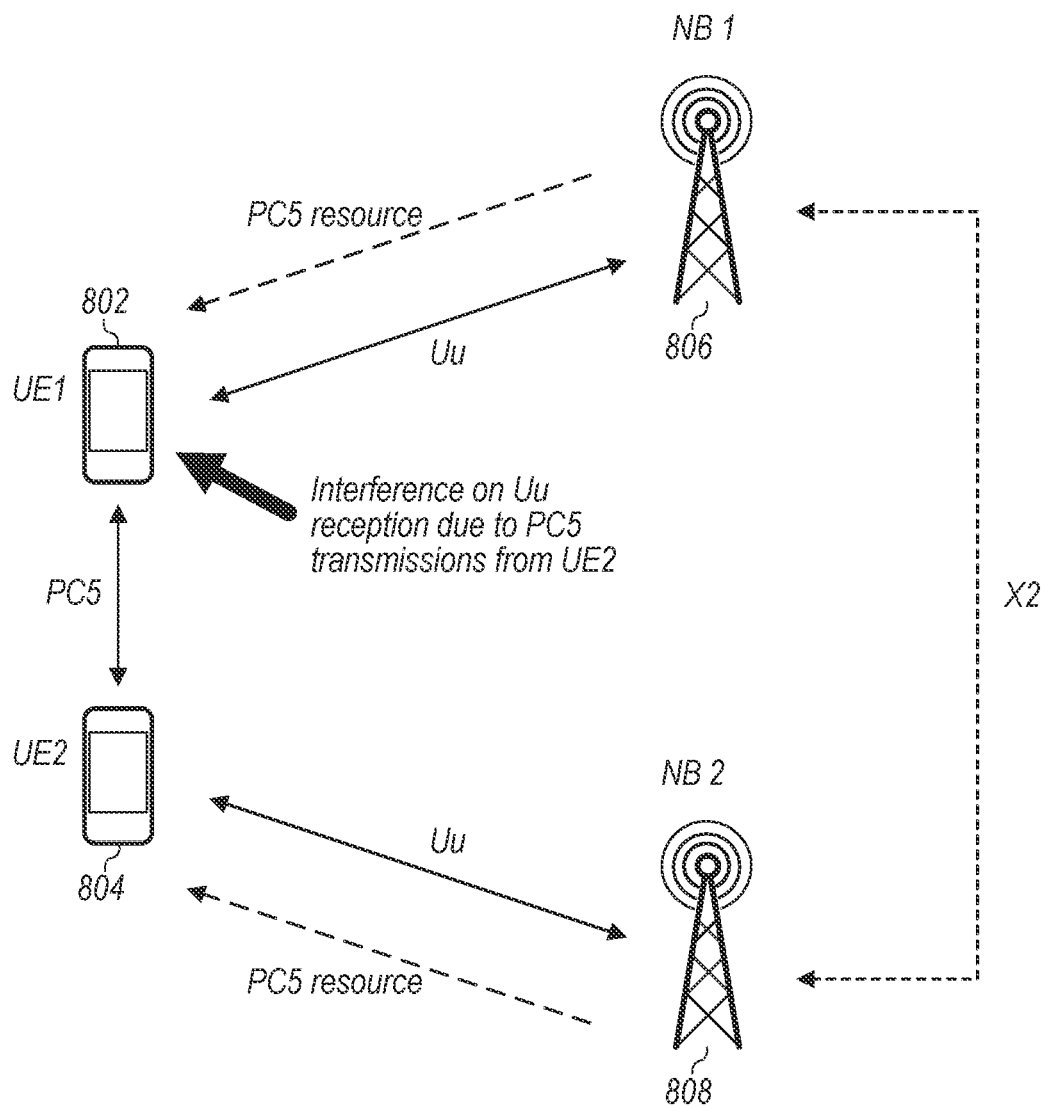
FIG. 8 shows a simplified system diagram of a cellular communication system in which two mobile devices communicate with respective base stations over respective Uu links while communicating with each other over a PC5 link, according to some embodiments.

FIG. 8 shows a simplified system diagram of a cellular communication system in which two UEs, 802 and 804, each communicate with respective base stations (NBs) 806 and 808 over respective Uu links while communicating with each other over a PC5 link (or SL). NB 806 may configure PC5 resources for UE 802 while NB 808 may configure PC5 resources for UE 804 via communications over the respective Uu links. However, transmissions over the PC5 link from UE 804 to UE 802 may interfere with downlink transmissions from NB 806 to UE 802. As mentioned above, UE 802 currently has no way of informing NB 806 about the interference of PC5 communications from UE 804 with the Uu transmissions from NB 806, so that NB 806 might reconfigure the PC5 resource allocation(s) for UE 802 to avoid any interference and/or coexistence issues. It should be noted that UE 804 may experience similar issues with respect to PC5 communications conducted between UE 802 and UE 804 and Uu communications conducted between UE 804 and NB 808.

Radio Resource Management to Mitigate IDC Issues Affecting PC5 and Uu links

In order to alleviate some of the IDC problems and issues described above, in some embodiments, the UE may cooperate with the NB in providing information to the NB regarding PC5 issues experienced by the UE. That is, the UE may inform the NB that communication between the UE and the NB over a first communication link conducted according to a given radio access technology (RAT), e.g. NR/LTE communications over a Uu link, are adversely affected by communications conducted by the UE over a second communication link with another UE, e.g. NR/LTE communications over a PC5 link, or NR/LTE SL communications.

Accordingly, in some embodiments, the NB may configure (cross carrier) measurement reporting (for PC5 measurements) when it allocates SL resources to the UE. In other words, when the NB is allocating the SL resources for the UE, the NB may also configure PC5 measurement reporting for the UE, to have the UE report PC5 measurements to the NB. The measurements may be indicative of channel conditions that indicate to the NB to what extent the allocated PC5 resources are useful and/or effective for the PC5 communications conducted by the UE. The NB may also configure another set of measurements, for example BLER, CBR and traffic volume measurements associated with the PC5 communications of the UE to enable the UE to indicate to the NB when inadequate or inefficient PC5 resource allocations were made to the UE. The UE may also transmit to the NB a UE capability message indicating whether the UE supports IDC on PC5. If the UE supports IDC on PC5, the NB may also configure IDC reporting for the UE when it allocates SL resources to the UE. The UE may subsequently transmit reports to the NB indicating PC5 frequencies that are affected due to aggression on the Uu link. E.g., the UE may report to the NB which PC5 resources, e.g. which PC5 frequencies over which the UE is conducting SL communications with another UE, are affected by the communications that the UE is conducting with the NB over the Uu link. In such cases the "aggressor" is considered to be the Uu link. Similarly, the UE may also report to the NB which Uu frequencies are affected by the SL communications conducted by the UE over the PC5 link with another UE. In such cases the "aggressor" is considered to be the PC5 link.

Therefore, the UE may transmit SL measurement reports to the NB (e.g. over the Uu link). These reports may be transmitted periodically or based on event triggering (e.g. triggered by a specific event or action(s)). The PC5 (or SL) measurements may be transmitted along with the Uu measurements or they may be reported separately. If IDC is configured, the UE may transmit to the NB a message that includes IDC assistance information indicating the interfering frequency/subframe number when the interference exceeds a given (e.g. a specified) threshold. The IDC assistance information may include the list of EUTRA carriers suffering from IDC problems, the direction of the interference (for example, whether the interference is during uplink or downlink Uu transmissions) and, if necessary, TDM patterns. The NB may analyze the Uu and PC5 measurements and may schedule PC5 and/or Uu resources (e.g. FDM and/or TDM resources) such that interference is reduced between the PC5 and Uu links during Uu and PC5 transmissions. The NB may similarly reconfigure PC5 resources if there is interference from other RATs over the relevant (overlapping or adjacent) frequencies, for example, interference from Wi-Fi or other radio circuitry/communications. If necessary, the NB may release or reconfigure secondary cells (for example in licensed or unlicensed bands) on the Uu link to reduce interference.

Referring again to FIG. 8, one aspect of radio resource management (RRM) for network assisted new radio V2X sidelink resource allocation from the NB (or network) side may be described as follows. NB 806 may inform NB 808 (e.g. over an X2 link, which is a communication link established between two base stations) that it (NB 808) may allocate resources to UE 804 (which is in communication with NB 808) for PC5 communications, if the PC5 resources of UE 804 are causing interference with the communication of UE 802 with NB 806. Alternately, or in addition, NB 806 may indicate, to NB 808, PC5 resources that may interfere with communications of UE 802 with NB 806 and/or may suggest PC5 resources that would not interfere with communications of UE 802 with NB 806. NB 808 may then update the PC5 resource allocation of UE 804 such that interference, caused by PC5 communications between UE 802 and UE 804, with the communications of UE 802 and NB 806 over the respective Uu link between UE 802 and NB 806 is reduced, thereby improving the performance of the Uu communications of UE 802 and NB 806. The use of measurement reports, IDC indication, and other feedback methods to combat interference and coexistence problems, and the reporting of resource allocation deficiencies to the NB (base station) may all be deployed for unicast, groupcast and/or broadcast modes of C-V2X communications.

Figure 9:
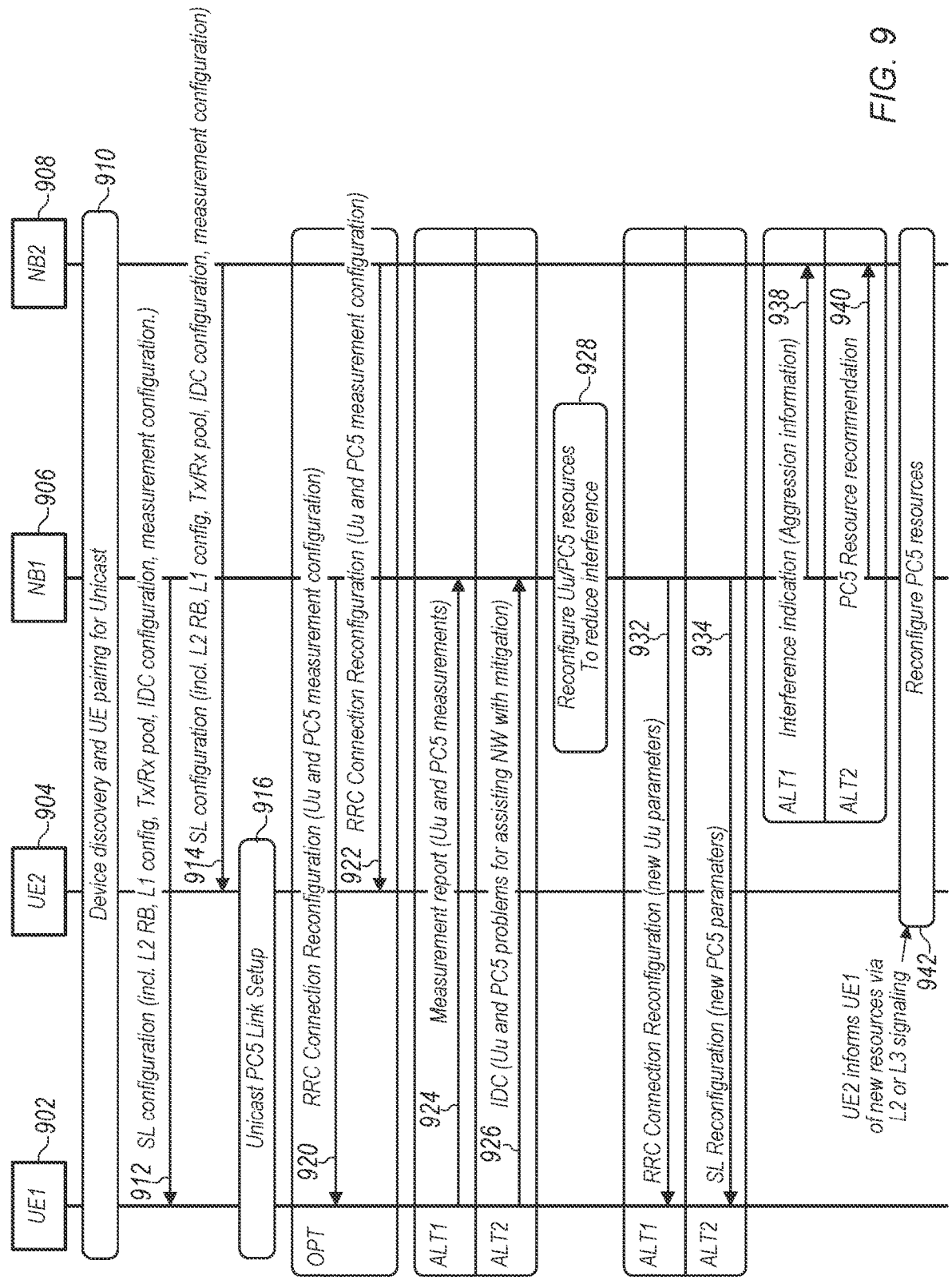
FIG. 9 shows an exemplary sidelink resource reconfiguration method for a unicast scenario, according to some embodiments.

One exemplary deployment of at least some of the above described methods for improved RRM of PC5 resources are illustrated in the timing diagram of FIG. 9, which shows an exemplary resource reconfiguration method for unicast scenario. It should be noted that while the example in FIG. 9 is directed to a unicast scenario, a similar method may equally be deployed for groupcast and/or broadcast scenarios. UEs 902 and 904 may undergo a device discovery for a UE pairing procedure for unicast transmissions, whereby UE 902 and UE 904 may communicate with each other over an SL, e.g. over the PC5 link (910). NB 906 may configure SL resources for UE 902 (for example, a layer 2 radio bearer, layer 1 configuration, transmit/receive pools, IDC configuration, and/or measurement configuration; 912), and NB 908 may perform a similar configuration for UE 904 (914). In one sense, in addition to configuring the SL resources for UE 902 and UE 904, respectively, NB 906 and NB 908 are also providing information to the UEs to indicate which resources and/or characteristics (for example associated with PC5 communications) the UEs are to monitor and later report to the NBs. As previously mentioned, the NBs may configure the UEs via communications conducted over the respective Uu links between the UEs and the NBs. A unicast PC5 link between UE 902 and UE 904 may then be set up according to the configurations made by the NBs (916). UE 902 and UE 904 may thus begin communicating with each other over the assigned PC5 resources.

Optionally, if there is a need, NB 906 and NB 908 may reconfigure the measurements of the Uu link and the PC5 link for UE 902 and UE 904, respectively (920, 922). That is, the NBs may configure the measurement reporting for the UEs at a later point in time once the UEs have already begun communicating with each other over the PC5 link. Thus, the measurement configuring may be performed in one step (912, 914), or two steps (912 and 920; 914 and 922). Once the measurement reporting for the UEs has been set up, UE 902 and UE 904 may begin monitoring for IDC issues and/or any other issues related to PC5 communications and Uu communications and how those communications may impact each other. Based on the monitoring, a UE, for example UE 902, may transmit a measurement report to its serving NB, in this case NB 906, which may include not only Uu measurements but also PC5 measurements (924). UE 902 may do this periodically, for example according to a previously established periodicity, or triggered by an event, for example a specific measurement exceeding a specified threshold value. Other trigger events may be defined as desired. UE 902 may also send an issue report indicating possible IDC problems, for example problems with the Uu link and/or the PC5 link that are impacting communications, to assist NB 906 with mitigating such issues that may arise (926).

In response to the report(s), the NB 906 may reconfigure the Uu and/or PC5 resources for the UE 902 in order to mitigate the issues that may have arisen, for example to reduce interference between the PC5 and Uu links and thus improve communications between UE 902 and UE 904, and between UE 902 and NB 906 (928). NB 906 may then send the new parameters associated with the reconfigured resources to UE 902. For example, NB 906 may transmit an RRC connection reconfiguration message to UE 902 with new Uu parameters (932) or it may transmit a SL reconfiguration message to UE 902 with new PC5 parameters (934). NB 906 may also forward interference indication information (for example, aggression information) to NB 908 (938) and/or provide PC5 resource recommendations for UE 904 to NB 908 (940). In effect, NB 906 may provide information to NB 908 indicating what is causing IDC problems and/or interference issues at UE 902 (which NB 906 is serving) to enable NB 908 to possibly reconfigure PC5 resources for UE 904 based on the received information and/or recommendations, to mitigate these issues. UE 902 and UE 904 may then coordinate and/or inform each other of the newly configured resources via layer 2 and/or layer 3 signaling over the PC5 link (942).

Secondary PC5 Resource Configuration

There may be cases when PC5 link resources are heavily interfering with the Uu link, possibly causing the Uu link to become non-functional. This may result in the measurement/IDC issue messages/reports transmitted by the UE not to reach the NB, and may also make it difficult if at all possible for the UE to decode transmissions from the NB. Therefore, in cases when the cross-channel interference between PC5 and Uu is already high, it may be difficult for the UE to decode the over-the-air (OTA) signaling messages which are scheduled/transmitted by the NB over the Uu link and which may include the reconfiguration parameters (see, for example, 932 and 934 in FIG. 9). Failed decoding attempts on the interfered link may further aggravate the interference problem. Another problem that may arise is the UE's being out of coverage and the configured SL resources experiencing high interference or high CBR. In order to address these issues, a fallback mechanism may be implemented that enables the UE to autonomously fallback to a configuration(s) without having to wait for a complete OTA configuration to reassign the Uu link and/or SL (PC5 link) resources.

Pursuant to the above, in some embodiments, during initial PC5 configuration, the NB may provide the UE with multiple PC5 configurations, for example a set of at least two (one primary and one secondary) PC5 configurations. Each configuration may be indicated by a configuration identification (ID) indicating which configuration is the primary configuration to be used. The secondary configuration may also include "exceptional" resources, for example resources intended for use under extreme conditions such as the conditions described in the previous paragraph. UEs may switch to this secondary configuration when they are in coverage (for example, they are within effective communication range of their respective base stations) and experiencing the extreme conditions. For out of coverage cases (for example, when the UEs are not within effective communication range of their respective base stations), the ProSe (proximity services) function may configure/provide at least one or several PC5 configurations, each configuration indicated by a configuration ID and potentially including exceptional resources to be used by the UEs when they are out of coverage. Furthermore, each configuration may also include certain trigger conditions, for example threshold conditions based on cross-channel interference and/or CBR metrics to name just a couple, which may cause the device to activate the secondary PC5 configuration in place of the problematic primary PC5 configuration. When conditions are met to switch to a secondary PC5 configuration, the UE may switch to the secondary configuration in response to being instructed by the NB when the UE is in coverage, or alternately, when the UE is out of coverage, the UE may use a secondary configuration provided by a ProSe function earlier when the UE was in service. The UE may indicate to the NB via an uplink (UL) measurement report that it has switched over to a secondary PC5 configuration (identified for example by a configuration ID) when it is in coverage. This solution is equally applicable to UEs operating in unicast, groupcast and/or broadcast mode of C-V2X communication.

At least one advantage of configuring secondary PC5 resource configurations as described above is the ability of the UE to autonomously switch to a backup PC5 configuration which results in reduced interference with the Uu link with respect to the interference caused by operating according to the previous PC5 configuration, without incurring any additional signaling delay contributed due to the compromised (aggressed) Uu interface/link. The solution may also be scalable based on the resource availability on the network side. For example, the network may choose to provide a list of backup PC5 configurations to assist devices (UEs) when the network resource budget allows for it. This solution also helps mitigate extreme interference or high CBR for in-coverage as well as out-of-coverage scenarios.

Figure 10:
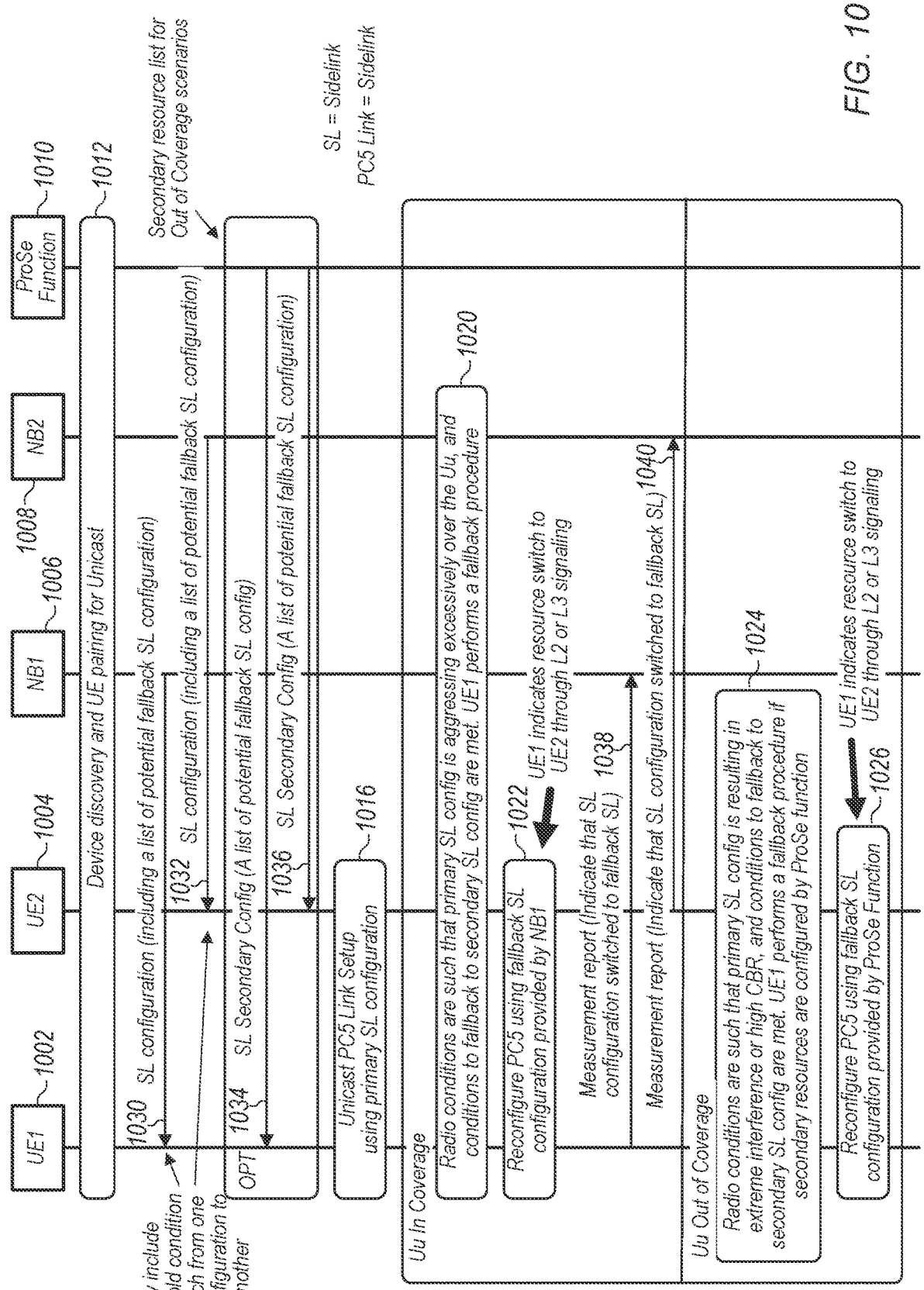
FIG. 10 shows an exemplary secondary or fallback sidelink resource configuration method for a unicast scenario, according to some embodiments.

One exemplary deployment of at least some of the above described solution for secondary PC5 resource configuration is illustrated in the timing diagram of FIG. 10, which shows an exemplary secondary (fallback) PC5 resource configuration method for unicast scenario. It should be noted that while the example in FIG. 10 is directed to a unicast scenario, a similar method may equally be deployed for groupcast and/or broadcast scenarios. UEs 1002 and 1004 may undergo a device discovery for a UE pairing procedure for unicast transmissions, whereby UE 1002 and UE 1004 may communicate with each other over an SL, e.g. over the PC5 link (1012). NB 1006 may configure SL (PC5) resources for UE 1002, including a list or number of potential secondary or fallback SL/PC5 configurations (1030), and NB 1008 may perform a similar configuration for UE 1004 (1032). The SL configuration information for each UE may also include the trigger/threshold conditions which may trigger the UE switching from one SL/PC5 configuration to another. The NBs may configure the UEs via communications conducted over the respective Uu links between the UEs and the NBs. Optionally, for example for scenarios when the UEs are out of coverage of the Uu link(s), the secondary SL/PC5 configurations may be configured by the ProSe function 1010, and may include a list of potential secondary or fallback SL/PC5 configurations (1034; 1036). A unicast PC5 link between UE 1002 and UE 1004 may then be set up according to the respective primary configurations made by the NBs (1016). UE 1002 and UE 1004 may thus begin communicating with each other over the assigned primary PC5 resources.

When UE 1002 is in coverage of NB 1006, UE 1002 may perform a fallback procedure to a secondary (fallback) SL/PC5 configuration when radio conditions are such that the primary SL configuration results in excessive interference with (or aggressing on) the Uu link and conditions to fallback to a secondary SL configuration are met, for example a threshold/trigger condition received during 1030/1032 is met (1020). The UE may reconfigure the PC5 link using the fallback SL configuration provided by the NB (1022). UE 1002 may also indicate to UE 1004 via layer 2 or layer 3 signaling that it has switched to a different set of PC5 resources. UE 1002 may further transmit a measurement report over the Uu link to NB 1006 to indicate that the SL configuration was switched to a secondary/fallback PC5 configuration (1038). UE 1004 may transmit a similar report to NB 1008 (1040).

When UE 1002 is not in coverage of NB 1006, that is, UE 1002 is out of coverage of the Uu link, UE 1002 may perform a fallback procedure when radio conditions are such that the primary SL configuration results in extreme interference or high CBR and the conditions to fallback to a secondary SL configurations are met, and the secondary PC5 resources are reconfigured by the ProSe function (1024). The UE may reconfigure the PC5 link using the fallback SL configuration provided by the ProSe function (1026). UE 1002 may also indicate to UE 1004 via layer 2 or layer 3 signaling that it has switched to a different set of PC5 resources.

Mitigating Interference on Uu by Creating Gaps on PC5/SL or Temporarily Suspending PC5/SL In cases when the cross channel interference (PC5 link over Uu link) is already high, it may be difficult for the UE to decode the over-the-air (OTA) signaling message that provides the reconfiguration parameters and is transmitted to the UE by the NB over the Uu interface. Failed decoding attempts on this interfered link may further aggravate the interference problem. Therefore, while RRC signaling is ongoing over the Uu to help mitigate the interference, gaps may be created on the PC5 link when the PC5 link is not used to transmit or receive safety messages. In addition, if the interference is higher than a given (e.g. specified) threshold, the PC5 may be temporarily suspended for the entire duration of the RRC signaling procedure so that a less aggressive PC5 link resource configuration may be obtained from the NB. The gap or the temporary suspension/resumption may be signaled to the other UE in the unicast or groupcast SL via layer 2 or layer 3 signaling.

Vehicles Connected to Different NBs

In some embodiments, platoon communications (for example, platoon C-V2X communications) for vehicles may be implemented with a designated group leader. A group leader may be selected in the platoon for central control, message broadcast, and also resource assignment. A group leader may assign UEs to compete for the resource representing the group (for inter-group resource competition). For the channel occupancy time (CoT) available for the group, a group leader may further divide the CoT into smaller individual time periods for each UE to transmit its own groupcast messages while other UEs are listening. In other words, the group leader may designate various portions of the CoT available to the group for groupcast messages to be transmitted by other members of the group. Group leader selection may be performed explicitly when building the group through a user interface (UI). In case a present leader (or most recently designated leader is no longer considered to be desired leader among users in the group, e.g., when the radio frequency (RF) conditions between the present group leader and other users in the group would adversely affect the communications within the group, it may be determined that the present group leader is to be replaced or switched to a different member of the group.

Figure 11:
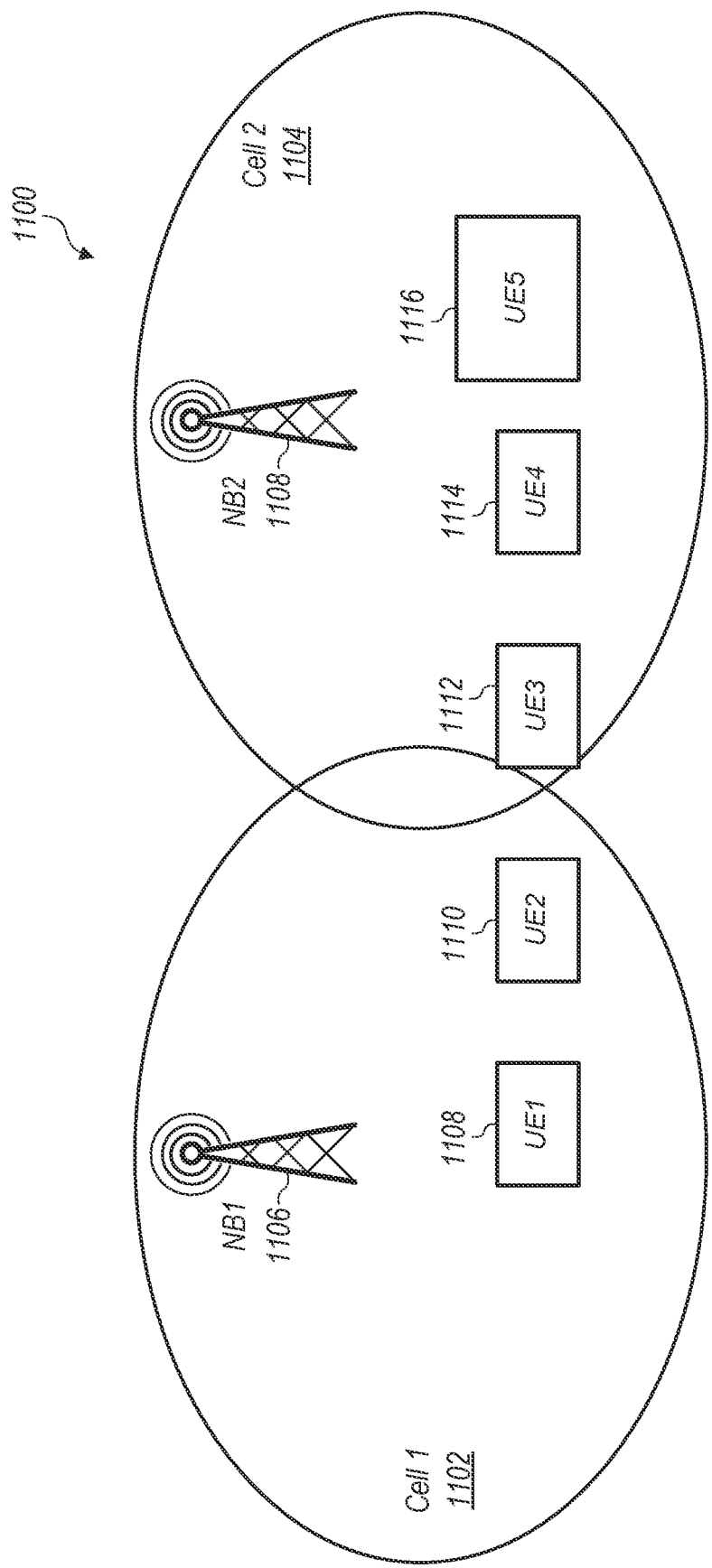
FIG. 11 shows an exemplary communication system with multiple vehicles which are not all in the coverage area of the same cell, according to some embodiments.

FIG. 11 shows an exemplary communication system 1100 with multiple vehicles 1108, 1110, 1112, 1114, and 1116 which are not all in the coverage area of the same cell. As shown in FIG. 11, UEs (vehicles) 1108 and 1110 are within the coverage area of cell 1102 (with associated NB 1106), while UEs (vehicles) 1112, 1114, and 1116 are within the coverage area of cell 1104 (with associated NB 1108). As the currently designated platoon leader, UE (vehicle) 1116 may assign resources (especially SL feedback resources) to all the member UEs (vehicles) 1108, 1110, 1112, and 1114 of the platoon, resulting in UE 1108 and UE 1110 utilizing SL resources assigned by another cell (cell 1104 with NB 1108)

than the cell (cell 1102 with NB 1106) currently serving UEs (vehicles) 1108 and 1110. This may lead to a conflict between Uu and SL transmissions at UEs (vehicles) 1108 and 1110 if NB 1106 is not informed of this. Furthermore, there may be interference from the SL transmissions/communications of UEs (vehicles) 1108 and 1110 to/with other UEs (not shown) also present in cell 1102.

In order to mitigate these issues, when a member UE is assigned SL resources by a platoon leader UE that is not in the same serving cell as the member UE, the member UE may inform the serving NB of the cell in which the member UE is presently located about the member UE having been assigned SL resources by another NB (or the serving NB of another cell). The information transmitted to its serving NB (e.g. to NB 1106) by the member UE (e.g. UE 1108 and/or UE 1110) may include the cell ID associated with the cell (e.g. cell 1104) in which the leader UE is presently located, enabling the serving NB (e.g. to NB 1106) to become aware of the serving cell ID (e.g. the ID of cell 1104) of the cell in which the leader UE is presently located. Cell 1102 (NB 1106) may then coordinate with cell 1104 (NB 1108) regarding the transmission resources used by the entire platooning group, including transmission resource pools in mode 2 and resource allocation in mode 1. The information may further (or alternatively) include a gap request for "SL and Uu" coexistence as previously described above. To support this procedure, the cell ID of the respective serving cell for each member UE may be shared among UE members of the platooning group. The coordination between the two cells may be stopped whenever the platooning group completely moves to another cell. The move may be determined/ascertain based on a handover, radio link failure or a radio resource management measurement report.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
   a memory; and
   at least one processor in communication with the memory and configured to cause a first device to:
      communicate with a second device over a Uu radio link according to a radio access technology (RAT);
      receive first information from the second device over the Uu radio link, wherein the first information includes:
         resource configuration information for the first device to perform PC5 communications with one or more peer devices over a PC5 radio link according to the RAT, wherein the resource configuration information includes a primary configuration for the PC5 radio link and a secondary configuration for the PC5 radio link; and
         measurement configuration information that configures the first device to measure a channel busy ratio (CBR) associated with the PC5 communications;
      perform CBR measurements associated with the PC5 communications;
      transmit, to the second device over the Uu radio link, a report based on the CBR measurements; and
      switch from communicating over the PC5 radio link according to the primary configuration to communicating over the PC5 radio link according to the secondary configuration in response to one or more conditions being met.

2. The apparatus of claim 1,
   wherein reports based on CBR measurements are transmitted periodically according to the measurement configuration information.

3. The apparatus of claim 1,
   wherein an event triggers a transmission of the report based on CBR measurements, and wherein the event comprises a CBR measurement exceeding a threshold.

4. The apparatus of claim 1,
   wherein the second device is a base station.

5. The apparatus of claim 1,
   wherein the RAT includes cellular wireless communication technology.

6. The apparatus of claim 1,
   wherein the at least one processor is further configured to cause the first device to:
      receive the resource configuration information and the measurement configuration information in separate respective messages; or
      receive the resource configuration information and the measurement configuration information in a same message.

7. The apparatus of claim 1,
   wherein the at least one processor is further configured to cause the first device to:

communicate with the one or more peer devices over the PC5 radio link according to one of:
sidelink unicast communications;
sidelink broadcast communications; or
sidelink groupcast communications.

8. The apparatus of claim 1,
wherein the resource configuration information includes a threshold condition and exceptional resources, and wherein the one or more conditions being met includes one or more of:
the threshold condition being met; or
encountering an unidentified error during communications with the one or more peer devices over the PC5 radio link according to the primary configuration.

9. A device comprising:
radio circuitry configured to facilitate wireless communications of the device over a first radio link according to a radio access technology (RAT) and over a second radio link according to the RAT; and
at least one processor communicatively coupled to the radio circuitry and configured to cause the device to:
communicate with a first device over the first radio link according to the RAT;
receive first information from the first device over the first radio link, wherein the first information includes:
resource configuration information for the device to perform sidelink communications with one or more peer devices over the second radio link according to the RAT, wherein the resource configuration includes a primary configuration for the second radio link and a secondary configuration for the second radio link; and
measurement configuration information that configures the device to measure a channel busy ratio (CBR) associated with the sidelink communications;
perform CBR measurements associated with the sidelink communications;
transmit, to the first device over the first radio link, a report based on the CBR measurements; and
switch from communicating over the second radio link according to the primary configuration to communicating over the second radio link according to the secondary configuration in response to one or more conditions being met.

10. The device of claim 9,
wherein reports based on CBR measurements are transmitted periodically according to the measurement configuration information.

11. The device of claim 9,
wherein an event triggers a transmission of the report based on CBR measurements, and wherein the event comprises a CBR measurement exceeding a threshold.

12. The device of claim 9,
wherein the first radio link is a Uu link, and wherein the second radio link is a PC5 radio link.

13. The device of claim 9,
wherein the at least one processor is further configured to cause the device to:
receive the resource configuration information and the measurement configuration information in separate respective messages; or
receive the resource configuration information and the measurement configuration information in a same message.

14. A non-transitory memory medium storing instructions executable by a processor to cause a device to:
communicate with a base station over a Uu radio link according to a radio access technology (RAT);
receive first information from the base station over the Uu radio link, wherein the first information includes:
resource configuration information for the device to perform PC5 communications with one or more peer devices over a PC5 radio link according to the RAT, wherein the resource configuration information includes a primary configuration for the PC5 radio link and a secondary configuration for the PC5 radio link; and
measurement configuration information that configures the device to measure a channel busy ratio (CBR) associated with the PC5 communications;
perform CBR measurements associated with the PC5 communications;
transmit, to the base station over the Uu radio link, a report based on the CBR measurements; and
switch from communicating over the PC5 radio link according to the primary configuration to communicating over the PC5 radio link according to the secondary configuration in response to one or more conditions being met.

15. The non-transitory memory medium of claim 14,
wherein reports based on CBR measurements are transmitted periodically according to the measurement configuration information.

16. The non-transitory memory medium of claim 14,
wherein an event triggers a transmission of the report based on CBR measurements, and wherein the event comprises a CBR measurement exceeding a threshold.

17. The non-transitory memory medium of claim 14,
wherein the resource configuration information includes a primary configuration and a secondary configuration.

18. The apparatus of claim 1,
wherein the measurement configuration information further configures the first device to measure one or more of:
block error rate (BLER) associated with the PC5 communications; or
traffic volume associated with the PC5 communication.

19. The device of claim 9,
wherein the measurement configuration information further configures the device to measure one or more of:
block error rate (BLER) associated with the sidelink communications; or
traffic volume associated with the sidelink communication.

20. The device of claim 9,
wherein the resource configuration information includes a threshold condition and exceptional resources, and wherein the one or more conditions being met includes one or more of:
the threshold condition being met; or
encountering an unidentified error during communications with the one or more peer devices over the second radio link according to the primary configuration.

* * * * *